United States Patent
Kim et al.

(10) Patent No.: US 9,926,989 B2
(45) Date of Patent: Mar. 27, 2018

(54) APPARATUS AND METHOD FOR LEARNING TOUCH POINT OF ENGINE CLUTCH OF HYBRID ELECTRIC VEHICLE

(71) Applicant: Hyundai Motor Company, Seoul (KR)

(72) Inventors: Do Hee Kim, Gyeonggi-do (KR); Joonyoung Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 157 days.

(21) Appl. No.: 14/924,157

(22) Filed: Oct. 27, 2015

(65) Prior Publication Data
US 2017/0009826 A1    Jan. 12, 2017

(30) Foreign Application Priority Data
Jul. 8, 2015   (KR) .......................... 10-2015-0097012

(51) Int. Cl.
*F16D 48/08*    (2006.01)
*B60K 6/387*    (2007.10)
(Continued)

(52) U.S. Cl.
CPC .............. *F16D 48/08* (2013.01); *B60K 6/387* (2013.01); *B60W 10/02* (2013.01); *B60W 10/06* (2013.01); *F16D 48/066* (2013.01); B60K 2006/4825 (2013.01); B60W 2510/0657 (2013.01); B60Y 2200/92 (2013.01); B60Y 2300/427 (2013.01); F16D 2500/1066 (2013.01);
(Continued)

(58) Field of Classification Search
CPC ................ F16D 48/08; F16D 48/066; F16D 2500/3066; F16D 2500/1066; B60K 6/387

USPC ........................................................ 701/22
See application file for complete search history.

(56) References Cited

U.S. PATENT DOCUMENTS

2007/0163821 A1*  7/2007  Ogata ..................... B60K 6/48
                                                    180/65.29
2010/0018790 A1*  1/2010  Allgaier .................. B60K 6/48
                                                    180/65.265
(Continued)

FOREIGN PATENT DOCUMENTS

JP          4360039 B2    11/2009
JP       2012-086596 A     5/2012
(Continued)

*Primary Examiner* — Redhwan K Mawari
*Assistant Examiner* — Rodney P King
(74) *Attorney, Agent, or Firm* — Mintz Levin Cohn Ferris Glovsky and Popeo, P.C.; Peter F. Corless

(57) ABSTRACT

An apparatus and a method are provided for learning a touch point of an engine clutch of a hybrid electric vehicle that learns the touch point of the engine clutch based on a change of an engine torque while the hybrid electric vehicle is running. The method includes determining whether an engine clutch coupling after shifting is required and whether a learning condition based on a running state of the hybrid electric vehicle is satisfied when the engine clutch coupling after shifting is required. A coupling pressure of the engine clutch is increased when the learning condition is satisfied and a changing amount of an engine torque based on the increased coupling pressure of the engine clutch is compared with a predetermined value. The touch point of the engine clutch is learned when the changing amount of the engine torque is greater than or equal to the predetermined value.

14 Claims, 3 Drawing Sheets

(51) Int. Cl.
  *F16D 48/06*    (2006.01)
  *B60W 10/02*    (2006.01)
  *B60W 10/06*    (2006.01)
  *B60K 6/48*     (2007.10)

(52) U.S. Cl.
  CPC .............. *F16D 2500/10412* (2013.01); *F16D 2500/3066* (2013.01); *F16D 2500/50251* (2013.01); *Y02T 10/6252* (2013.01); *Y10S 903/93* (2013.01)

(56) References Cited

U.S. PATENT DOCUMENTS

| | | | |
|---|---|---|---|
| 2011/0153134 A1 | 6/2011 | Rocq et al. | |
| 2011/0160947 A1* | 6/2011 | Ideshio | B60K 6/387 701/22 |
| 2014/0067174 A1* | 3/2014 | Park | F16H 61/061 701/22 |
| 2014/0121873 A1* | 5/2014 | Choi | B60K 6/48 701/22 |
| 2014/0136064 A1* | 5/2014 | Baek | F16D 48/06 701/68 |
| 2014/0155222 A1* | 6/2014 | Kim | B60K 6/442 477/5 |

FOREIGN PATENT DOCUMENTS

| | | |
|---|---|---|
| JP | 2013-072521 A | 4/2013 |
| JP | 2015-025547 A | 2/2015 |
| KR | 10-1000424 B1 | 12/2010 |
| KR | 10-2014-0060009 A | 5/2014 |
| KR | 10-1470209 B1 | 12/2014 |
| KR | 10-1484228 B1 | 1/2015 |
| KR | 10/1484233 B1 | 1/2015 |
| KR | 10-2015-0012151 A | 2/2015 |

* cited by examiner

APPARATUS AND METHOD FOR LEARNING TOUCH POINT OF ENGINE CLUTCH OF HYBRID ELECTRIC VEHICLE

CROSS-REFERENCE TO RELATED APPLICATION

This application claims priority to and the benefit of Korean Patent Application No. 10-2015-0097012 filed in the Korean Intellectual Property Office on Jul. 8, 2015, the entire contents of which are incorporated herein by reference.

BACKGROUND (a) Field of the Invention

The present invention relates to an apparatus and a method for learning a touch point of an engine clutch of a hybrid electric vehicle and more particularly, to an apparatus and a method for learning a touch point of an engine clutch of a hybrid electric vehicle that learns the touch point of the engine clutch based on a change of an engine torque during the hybrid electric vehicle running (b) Description of the Related Art Generally, a hybrid electric vehicle is driven by an engine which generates torque from fuel combustion and an electric motor which generates torque from an electric battery. Hybrid electric vehicles can be provided with optimum output torque, based on how the engine and the motor are operated while the vehicles are driven by the two power sources, that is, the engine and the motor.

In the hybrid electric vehicle, to transfer power of the engine to a driving shaft, an engine clutch is mounted between the engine and the motor. The hybrid vehicle provides an electric vehicle (EV) mode that provides running of the vehicle with a torque of the motor and a hybrid electric vehicle (HEV) mode that provides running of the vehicle with the sum of an engine torque and a motor torque based on whether the engine clutch is coupled. The hybrid electric vehicle estimates and learns a touch point of the engine clutch for a stable power delivery and a rapid torque response.

A transmission mounted electric device (TMED) type of the hybrid electric vehicle which includes an automatic transmission uses a wet engine clutch and learns the touch point of the engine clutch when a shift stage is a park (P) stage or a neutral (N) stage. However, the hybrid electric vehicle which includes a dual clutch transmission (DCT) uses a dry engine clutch, so frequent learning of the touch point of the engine clutch is necessary compared to the wet engine clutch. Moreover, a conventional method for learning the touch point of the engine clutch applied to wet engine clutch may be less accurate.

The above information disclosed in this section is merely for enhancement of understanding of the background of the invention and therefore it may contain information that does not form the prior art that is already known in this country to a person of ordinary skill in the art.

SUMMARY

The present invention provides an apparatus and a method for learning a touch point of an engine clutch of a hybrid electric vehicle having advantages of learning the touch point of the engine clutch based on a change of an engine torque during the hybrid electric vehicle running An exemplary embodiment of the present invention provides a method for learning a touch point of an engine clutch of a hybrid electric vehicle including a motor connected to a transmission and an engine selectively connected to the motor via the engine clutch that may include determining whether an engine clutch coupling after shifting is required; determining whether a learning condition based on a running state of the hybrid electric vehicle is satisfied when the engine clutch coupling after shifting is required; increasing a coupling pressure of the engine clutch when the learning condition is satisfied; comparing a changing amount of an engine torque based on the increased coupling pressure of the engine clutch with a predetermined value; and learning the touch point of the engine clutch when the changing amount of the engine torque is greater than or equal to the predetermined value.

The engine clutch coupling after shifting may be required when a demand torque of a driver is greater than or equal to a predetermined torque and a current motor speed is less than or equal to a target speed after shifting in consideration of discharging power of a battery. The learning condition may be satisfied when a battery state of charge (SOC) is within a predetermined range, a shifting state is a drive (D) stage, and the hybrid electric vehicle is being shifted. The coupling pressure of the engine clutch may be increased by a signal rating which has an increasing form. The method may further include determining whether an engine speed is synchronized with a motor speed; and coupling the engine clutch when the engine speed is synchronized with the motor speed after learning the touch point of the engine clutch.

Another exemplary embodiment of the present invention provides an apparatus for learning a touch point of an engine clutch of a hybrid electric vehicle including a motor connected to a transmission and an engine selectively connected to the motor through the engine clutch that may include a driving information detector configured to detect a running state of the hybrid electric vehicle; and a controller configured to couple or release the engine clutch based on a signal from the driving information detector. Additionally, the controller may be configured to determine whether a learning condition is satisfied when an engine clutch coupling after shifting is required and learn the touch point of the engine clutch by increasing a coupling pressure of the engine clutch when the learning condition is satisfied.

The controller may further be configured to compare a changing amount of an engine torque based on the increased coupling pressure of the engine clutch with a predetermined value, and learn the touch point of the engine clutch when the changing amount of the engine torque is greater than or equal to the predetermined value. The controller may be configured to determine that the engine clutch coupling after shifting is required when a demand torque of a driver is greater than or equal to a predetermined torque and a current motor speed is less than or equal to a target speed after shifting in consideration of discharging power of a battery.

Furthermore, the controller may be configured to determine that the learning condition is satisfied when a battery state of charge (SOC) is within a predetermined range, a shifting state is a D stage, and the hybrid electric vehicle is being shifted. The controller may then be configured to increase the coupling pressure of the engine clutch by a signal rating which has an increasing form. The engine clutch may include a dry engine clutch. The controller may be configured to couple the engine clutch when an engine speed is synchronized with a motor speed after learning the touch point of the engine clutch.

As described above, according to an exemplary embodiment of the present invention, a touch point of the engine clutch may be learned while the hybrid electric vehicle is running, and accuracy of the touch point of the engine clutch may be improved. Therefore, coupling impact of the engine clutch may be decreased, thereby improving drivability of the hybrid electric vehicle.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1:
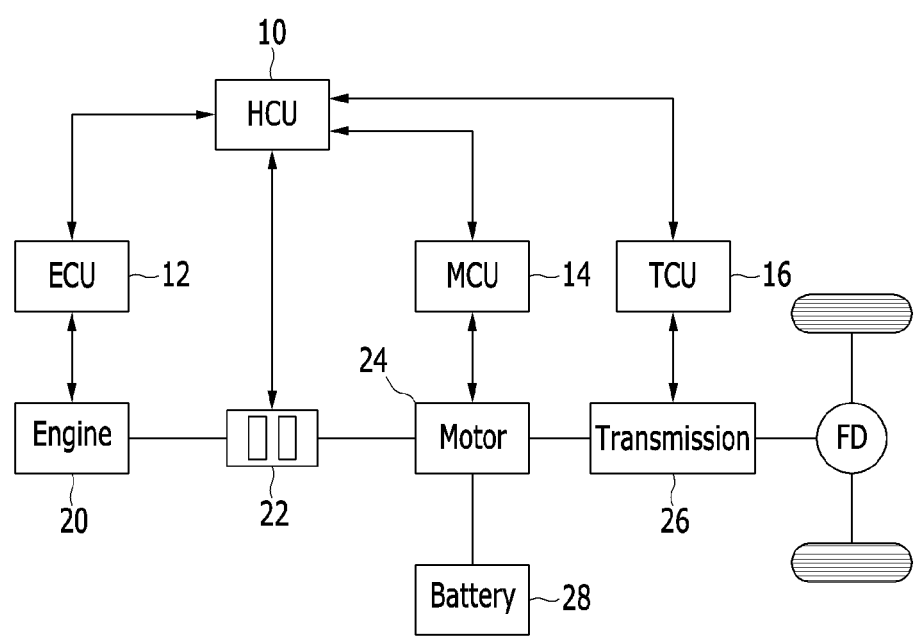
FIG. 1 is a diagram of a hybrid system to which a method for learning a touch point of an engine clutch of a hybrid electric vehicle is applied according to an exemplary embodiment of the present invention.

In the following detailed description, exemplary embodiments of the present invention have been shown and described, simply by way of illustration. As those skilled in the art would realize, the described exemplary embodiments may be modified in various different ways, all without departing from the spirit or scope of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Like reference numerals designate like elements throughout the specification.

It is understood that the term "vehicle" or "vehicular" or other similar term as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example, vehicles powered by both gasoline and electricity.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Although exemplary embodiment is described as using a plurality of units to perform the exemplary process, it is understood that the exemplary processes may also be performed by one or plurality of modules or at least one controller/control unit. The term controller/control unit refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

An exemplary embodiment of the present invention will hereinafter be described in detail with reference to the accompanying drawings.

FIG. 1 is a diagram of a hybrid system to which a method for learning a touch point of an engine clutch of a hybrid electric vehicle is applied according to an exemplary embodiment of the present invention. The hybrid system as shown in FIG. 1 is an exemplary embodiment of the present invention for better comprehension and ease of description. Therefore, a method for learning a touch point of an engine clutch of a hybrid electric vehicle according to an exemplary embodiment of the present invention may not only be applied to the hybrid system as shown in FIG. 1, but may also be applied to all other hybrid systems.

As shown in FIG. 1, the hybrid system to which a method for learning a touch point of an engine clutch of a hybrid electric vehicle is applied according to an exemplary embodiment of the present invention may include a hybrid control unit (HCU) 10, an electronic control unit (ECU) 12, a motor control unit (MCU) 14, a transmission control unit (TCU) 16, an engine 20, an engine clutch 22, a motor 24, a transmission 26, and a battery 28.

The HCU 10 may be configured to operate the other controllers (e.g., control units) which mutually exchange information in an entire operation of a hybrid electric vehicle, and thus, the HCU 10 may be configured to adjust output torque of the engine 20 and the motor 24 by cooperating with the other controllers. In particular, the ECU 12 may be configured to operate the engine 20 based on conditions of the engine 20, such as a demand torque of a driver, a coolant temperature, and an engine torque. The MCU 14 may be configured to operate the motor 24 based on a demand torque of a driver, a driving mode of the hybrid electric vehicle, and a state of charge (SOC) condition of the battery 28. The TCU 16 may be configured to operate the transmission 26 such as speed ratios of the transmission 26 based on output torque of the engine 20 and the motor 24, and an amount of regenerative braking.

The engine 20 may be configured to output power as a power source while turned on. The engine clutch 22 may be disposed between the engine 20 and the motor 24 to receive a control signal of the HCU 10, and selectively connect the engine 20 and the motor 24 based on a driving mode of the hybrid electric vehicle. The motor 24 may be operated by a 3-phase alternating current (AC) voltage applied from the battery 28 using an inverter to generate torque, and may be configured to operate as a power generator and supply regenerative energy to the battery 28 in a coast-down mode.

The transmission 26 may be configured to supply a sum of an output torque of the engine 20 and an output torque of the motor 24 determined by coupling and releasing of the engine clutch 22 as an input torque selects any shift gear based on a vehicle speed and a driving condition to output driving force to a driving wheel and maintain driving. The transmission 26 may be an automatic transmission (AT) that includes a plurality of planetary gear sets and a plurality of friction elements or a dual clutch transmission (DCT) that includes a plurality of synchronizers and an actuator, but is not limited thereto. The battery 28 may include a plurality of unit cells, and may be configured to support a high voltage for supplying a voltage to the motor 24, for example, about 400 V or 450 V DC.

The hybrid system as described above is obvious to a person of ordinary skill in the art, so a detailed explanation thereof will be omitted.

Figure 2:
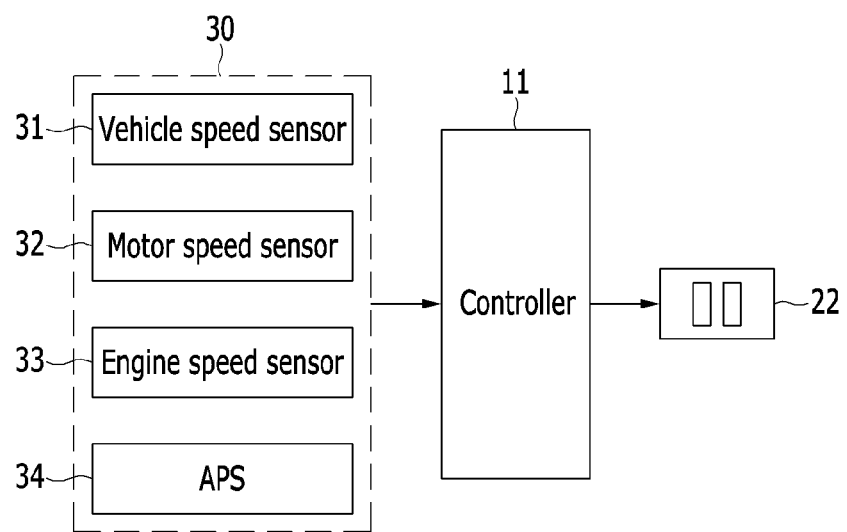
FIG. 2 is a block diagram of an apparatus for learning a touch point of an engine clutch of a hybrid electric vehicle according to an exemplary embodiment of the present invention.

FIG. 2 is a block diagram of an apparatus for learning a touch point of an engine clutch of a hybrid electric vehicle according to an exemplary embodiment of the present invention. As shown in FIG. 2, an apparatus for learning a touch point of an engine clutch of a hybrid electric vehicle according to an exemplary embodiment of the present invention may include an engine clutch 22, a driving information detector 30, and a controller 11 which may be configured to operate the engine clutch 22 and the driving information detector 30 (e.g., a sensor).

Processes in the method for learning the touch point of the engine clutch of the hybrid electric vehicle according to an exemplary embodiment of the present invention to be described below may be performed by integrating or subdividing due to each controller. Therefore, for convenience of description, in this specification and claims, many controllers indisposed within the hybrid electric vehicle are referred to as the controller 11.

The hybrid electric vehicle to which an exemplary embodiment of the present invention is applied may include at least one engine 20 and at least one motor 24. In addition, the hybrid electric vehicle may provide a driving mode in which the engine 20 and the motor 24 operate separately or simultaneously as a power source. For this purpose, the engine clutch may be disposed between the engine 20 and the motor 24 to selectively connect the engine 20 and the motor 24. Particularly, in the exemplary embodiment of the present invention, the engine clutch 22 may be a dry engine clutch.

The driving information detector 30 may be configured to detect a running state of the hybrid electric vehicle and may include a vehicle speed sensor 31, a motor speed sensor 32, an engine speed sensor 33, and an accelerator pedal position sensor (APS) 34. The vehicle speed sensor 31 may be configured to detect a speed of the vehicle, and transmit a corresponding signal to the controller 11. The motor speed sensor 32 may be configured to detect a rotation speed of the motor 24, and transmit a corresponding signal to the controller 11. The engine speed sensor 33 may be configured to detect a rotation speed of the engine 20, and transmit a corresponding signal to the controller 11.

Further, the accelerator pedal position sensor 34 may be configured to continuously detect a position value of an accelerator pedal, and transmit a monitoring signal to the controller 11. The position value of the accelerator pedal may be 100% when the accelerator pedal is fully engaged, and the position value of the accelerator pedal may be 0% when the accelerator pedal is disengaged (e.g., no pressure is applied to the pedal). A throttle valve position sensor (TPS) mounted on an intake pipe may be used instead of the accelerator pedal position sensor 34. Therefore, in this specification and the scope of the appended claims, the accelerator pedal position sensor 34 may include the throttle valve position sensor, and the position value of the accelerator pedal may be understood to be an opening value of the throttle valve.

The controller 11 may be configured to determine whether a learning condition is satisfied when an engine clutch coupling after shifting is required and learn the touch point of the engine clutch 22 by increasing a coupling pressure of the engine clutch when the learning condition is satisfied. The controller 11 may further be configured to compare a changing amount of an engine torque based on the increased coupling pressure of the engine clutch with a predetermined value, and learn the touch point of the engine clutch when the changing amount of the engine torque is greater than or equal to the predetermined value.

In addition, the controller 11 may be configured to couple the engine clutch when an engine speed is synchronized with a motor speed after learning the touch point of the engine clutch 22. For these purposes, the controller 11 may be implemented as at least one processor operated by a predetermined program, and the predetermined program may be programmed to perform each step of a method for learning the touch point of the engine clutch of the hybrid electric vehicle according to an exemplary of the present invention. Various exemplary embodiments described herein may be implemented within a recording medium that may be read by a computer or a similar device by using software, hardware, or a combination thereof, for example.

According to hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units designed to perform any other functions.

According to software implementation, embodiments such as procedures and functions described in the present embodiments may be implemented by separate software modules. Each of the software modules may perform one or more functions and operations described in the present invention. A software code may be implemented by a software application written in an appropriate program language.

Hereinafter, a method for learning a touch point of an engine clutch of a hybrid electric vehicle according to an exemplary embodiment of the present invention will be described in detail with reference to FIG. 3.

Figure 3:
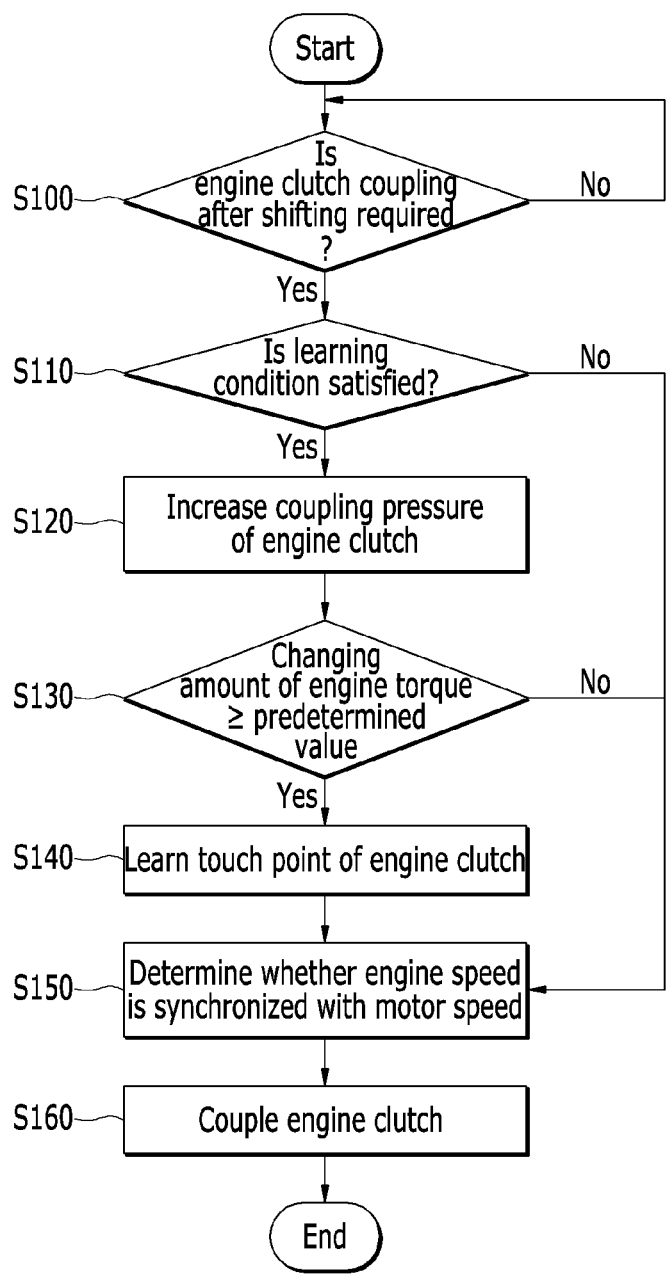
FIG. 3 is a flowchart showing a method for learning a touch point of an engine clutch of a hybrid electric vehicle according to an exemplary embodiment of the present invention.

FIG. 3 is a flowchart showing a method for learning a touch point of an engine clutch of a hybrid electric vehicle according to an exemplary embodiment of the present invention. As shown in FIG. 3, a method for learning a touch point of an engine clutch of a hybrid electric vehicle according to an exemplary embodiment of the present invention may begin with determining whether an engine clutch coupling after shifting is required based on a signal from the driving information detector 30 at step S100.

When an engine clutch coupling before shifting is required, the method according to an exemplary embodiment of the present invention may not learn the touch point of the engine clutch. When the engine clutch is coupled before shifting, the engine clutch 22 may be rapidly coupled for rapid power delivery. Thus, there is no time to learn the touch point of the engine clutch while the hybrid electric vehicle is running. Further, when the engine clutch is coupled after shifting, the engine 20 may wait to complete shifting while maintaining an engine speed. Accordingly, the touch point of the engine clutch may be learned while the hybrid electric is vehicle running Whether the engine clutch coupling after shifting is required may be determined by detecting a demand torque or a demand power of a driver and comparing a current motor speed with a target speed after shifting in consideration of discharging power of a battery. In other words, a controller 11 may be configured to determine that the engine clutch coupling after shifting is required when the demand torque of the driver is greater than or equal to a predetermined torque and the current motor speed is less than or equal to the target speed after shifting in consideration of discharging power of the battery. For example, when a down shift is performed due to the demand torque of the driver being greater than or equal to a predetermined torque, a motor speed may be increased. An engine speed follows the motor speed for synchronization and may be adjusted by a HSG, and thus discharging power of the battery should be considered.

When the engine clutch coupling after shifting is required at the step S100, the controller 11 may be configured to determine whether a learning condition based on a running state of the hybrid electric vehicle is satisfied at step S110. The learning condition may be determined to be satisfied when a battery state of charge (SOC) is within a predetermined range, a shifting state is a D stage, and the hybrid electric vehicle is shifting. For example, a friction element of the transmission may repeatedly perform engagement and release during shifting in a D stage, to generate a neutral state more rapidly. At this time, the touch point of the engine clutch may be learned. Thus, the controller 11 may be configured to determine that the learning condition is satisfied when a battery state of charge (SOC) is within a predetermined range, a shifting state is a D stage, and the hybrid electric vehicle is shifting.

When the learning condition is satisfied at the step S110, the controller 11 may be configured to increase a coupling pressure of the engine clutch at step S120. The coupling pressure of the engine clutch may be increased by a signal rating which has an increasing form. For example, a signal which has a ramp form monotone increasing or step increasing may be used. When the coupling pressure of the engine clutch is increased at the step S120, the controller 11 may be configured to compare a changing amount of an engine torque based on the increased coupling pressure of the engine clutch with a predetermined value at step S130.

When the engine clutch is coupled, the engine 20 may be maintained at a substantially constant speed, to change the engine torque based on a load of the motor and the transmission. Therefore, when the changing amount of the engine torque is greater than or equal to the predetermined value, the controller 11 may be configured to learn the touch point of the engine clutch at step S140. After that, the controller 11 may be configured to determine whether an engine speed is synchronized with a motor speed at step S150, and couple the engine clutch 22 when the engine speed is synchronized with the motor speed at step S160.

As described above, according to an exemplary embodiment of the present invention, the touch point of the engine clutch may be learned during the hybrid electric vehicle running, and accuracy of the touch point of the engine clutch may be improved. Therefore, coupling impact of the engine clutch may be decreased, thereby improving drivability of the hybrid electric vehicle.

While this invention has been described in connection with what is presently considered to be exemplary embodiments, it is to be understood that the invention is not limited to the disclosed exemplary embodiments. On the contrary, it is intended to cover various modifications and equivalent arrangements included within the spirit and scope of the appended claims.

What is claimed is:

1. A method for learning a touch point of an engine clutch of a hybrid electric vehicle having a motor connected to a transmission and an engine selectively connected to the motor via the engine clutch, comprising:
   determining, by a controller, whether an engine clutch coupling after shifting is required;
   determining, by the controller, whether a learning condition based on a running state of the hybrid electric vehicle is satisfied when the engine clutch coupling after shifting is required;
   increasing, by the controller, a coupling pressure of the engine clutch when the learning condition is satisfied;
   comparing, by the controller, a changing amount of an engine torque based on the increased coupling pressure of the engine clutch with a predetermined value; and
   learning, by the controller, the touch point of the engine clutch when the changing amount of the engine torque is greater than or equal to the predetermined value,
   wherein the engine clutch coupling after shifting is required when a demand torque of a driver is greater than or equal to a predetermined torque and a current motor speed is less than or equal to a target speed after shifting in consideration of discharging power of a battery.

2. The method of claim 1, wherein the learning condition is satisfied when a battery state of charge (SOC) is within a predetermined range, a shifting state is a drive (D) stage, and the hybrid electric vehicle is shifting.

3. The method of claim 1, wherein the coupling pressure of the engine clutch is increased by a signal rating which has an increasing form.

4. The method of claim 1, further comprising:
   after learning the touch point of the engine clutch, determining, by the controller, whether an engine speed is synchronized with a motor speed; and
   coupling, by the controller, the engine clutch when the engine speed is synchronized with the motor speed.

5. An apparatus for learning a touch point of an engine clutch of a hybrid electric vehicle having a motor connected to a transmission and an engine selectively connected to the motor through the engine clutch, comprising:
   a driving information detector configured to detect a running state of the hybrid electric vehicle; and
   a controller configured to couple or release the engine clutch based on a signal from the driving information detector,
   wherein the controller is configured to determine whether a learning condition is satisfied when an engine clutch coupling after shifting is required and learn the touch point of the engine clutch by increasing a coupling pressure of the engine clutch when the learning condition is satisfied,
   wherein the controller is configured to compare a changing amount of an engine torque based on the increased coupling pressure of the engine clutch with a predetermined value, and learn the touch point of the engine clutch when the changing amount of the engine torque is greater than or equal to the predetermined value, and wherein the controller is configured to determined that the engine clutch coupling after shifting is required when a demand torque of a driver is greater than or equal to a predetermined torque and a current motor speed is less than or equal to a target speed after shifting in consideration of discharging power of a battery.

6. The apparatus of claim 5, wherein the controller is configured to determine that the learning condition is satisfied when a battery state of charge (SOC) is within a predetermined range, a shifting state is a drive (D) stage, and the hybrid electric vehicle is shifting.

7. The apparatus of claim 5, wherein the controller is configured to increase the coupling pressure of the engine clutch through a signal rating which has an increasing form.

8. The apparatus of claim 5, wherein the engine clutch includes a dry engine clutch.

9. The apparatus of claim 5, wherein the controller is configured to couple the engine clutch when an engine speed is synchronized with a motor speed after learning the touch point of the engine clutch.

10. The apparatus of claim 5, wherein the driving information detector includes a vehicle speed sensor, a motor speed sensor, an engine speed sensor, and an accelerator pedal position sensor (APS).

11. A non-transitory computer readable medium containing program instructions executed by a controller for learning a touch point of an engine clutch of a hybrid electric vehicle having a motor connected to a transmission and an engine selectively connected to the motor via the engine clutch, the computer readable medium comprising:

program instructions that determine whether an engine clutch coupling after shifting is required;

program instructions that determine whether a learning condition based on a running state of the hybrid electric vehicle is satisfied when the engine clutch coupling after shifting is required;

program instructions that increase a coupling pressure of the engine clutch when the learning condition is satisfied;

program instructions that compare a changing amount of an engine torque based on the increased coupling pressure of the engine clutch with a predetermined value; and program instructions that learn the touch point of the engine clutch when the changing amount of the engine torque is greater than or equal to the predetermined value, wherein the engine clutch coupling after shifting is required when a demand torque of a driver is greater than or equal to a predetermined torque and a current motor speed is less than or equal to a target speed after shifting in consideration of discharging power of a battery.

12. The non-transitory computer readable medium of claim 11, wherein the learning condition is satisfied when a battery state of charge (SOC) is within a predetermined range, a shifting state is a drive (D) stage, and the hybrid electric vehicle is shifting.

13. The non-transitory computer readable medium of claim 11, wherein the coupling pressure of the engine clutch is increased by a signal rating which has an increasing form.

14. The non-transitory computer readable medium of claim 11, further comprising:

program instructions that determine whether an engine speed is synchronized with a motor speed after learning the touch point of the engine clutch; and program instructions that couple the engine clutch when the engine speed is synchronized with the motor speed.

* * * * *